United States Patent
Ratner et al.

(10) Patent No.: US 7,848,571 B2
(45) Date of Patent: Dec. 7, 2010

(54) COMPUTER-IMPLEMENTED METHOD FOR EFFICIENT IMAGE SEGMENTATION USING AUTOMATED SADDLE-POINT DETECTION

(75) Inventors: Edward R. Ratner, Los Altos, CA (US); Schuyler A. Cullen, Mt. View, CA (US)

(73) Assignee: Keystream Corporation, Mountain View, CA (US)

( * ) Notice: Subject to any disclaimer, the term of this patent is extended or adjusted under 35 U.S.C. 154(b) by 834 days.

(21) Appl. No.: 11/821,639

(22) Filed: Jun. 25, 2007

(65) Prior Publication Data

US 2008/0123958 A1    May 29, 2008

Related U.S. Application Data

(60) Provisional application No. 60/805,792, filed on Jun. 26, 2006.

(51) Int. Cl.
*G06K 9/34* (2006.01)
(52) U.S. Cl. .................................................. 382/173
(58) Field of Classification Search ............... None
See application file for complete search history.

(56) References Cited

U.S. PATENT DOCUMENTS

| | | | |
|---|---|---|---|
| 5,825,910 A * | 10/1998 | Vafai .......................... 382/132 |
| 5,940,538 A * | 8/1999 | Spiegel et al. ............... 382/236 |
| 6,018,592 A | 1/2000 | Shinagawa et al. |
| 6,081,617 A | 6/2000 | Bangham et al. |
| 6,668,082 B1 * | 12/2003 | Davison et al. ............. 382/190 |
| 7,010,164 B2 | 3/2006 | Weese et al. |
| 7,113,617 B2 * | 9/2006 | Kimmel et al. ............. 382/106 |
| 7,130,469 B2 * | 10/2006 | Adachi ........................ 382/224 |
| 7,133,572 B2 * | 11/2006 | Neubauer et al. ........... 382/282 |
| 7,215,872 B2 | 5/2007 | Akiyoshi et al. |
| 7,532,762 B2 * | 5/2009 | Sekiguchi et al. .......... 382/233 |
| 7,697,742 B2 * | 4/2010 | Dehmeshki ................. 382/131 |
| 2002/0097912 A1 * | 7/2002 | Kimmel et al. ............. 382/199 |
| 2002/0114536 A1 * | 8/2002 | Xiong et al. ................ 382/284 |
| 2003/0174889 A1 | 9/2003 | Comaniciu et al. |
| 2004/0066964 A1 * | 4/2004 | Neubauer et al. ........... 382/152 |
| 2005/0232485 A1 * | 10/2005 | Brown et al. ................ 382/173 |
| 2006/0056695 A1 * | 3/2006 | Wu et al. .................... 382/173 |

OTHER PUBLICATIONS

PCT International Search Report for Application No. PCT/US07/14807, Sep. 23, 2008 (3 sheets).

* cited by examiner

*Primary Examiner*—Yuzhen Ge
(74) *Attorney, Agent, or Firm*—Okamoto & Benedicto LLP

(57) ABSTRACT

One embodiment relates to a computer-implemented method of image segmentation using automated saddle point detection. An edge map is created by edge detection, and a distance map is generated based on the edge map. Saddle points are detected using the distance map. Connector pixels are determined using the saddle points, and connector pixels forming valid connecting paths are marked as edge pixels. Finally, flood filling is performed within edges to designate image segments. Other features, aspects and embodiments are also disclosed.

10 Claims, 19 Drawing Sheets

The pixels marked with an "E" are edge pixels.

Distance Map

| 16 | 16 | 16 | 16 | 17 | 20 | 17 | 16 | 16 | 16 | 16 |
|----|----|----|----|----|----|----|----|----|----|----|
| 9  | 9  | 9  | 9  | 10 | 13 | 10 | 9  | 9  | 9  | 9  |
| 4  | 4  | 4  | 4  | 5  | 8  | 5  | 4  | 4  | 4  | 4  |
| 1  | 1  | 1  | E  | 2  | 5  | 2  | 1  | 1  | 1  | 1  |
| E  | E  | E  | 1  | 1  | 4  | 1  | E  | E  | E  | E  |
| 1  | 1  | 1  | E  | 2  | 5  | 2  | 1  | 1  | 1  | 1  |
| 4  | 4  | 4  | 4  | 5  | 8  | 5  | 4  | 4  | 4  | 4  |
| 9  | 9  | 9  | 9  | 10 | 13 | 10 | 9  | 9  | 9  | 9  |
| 16 | 16 | 16 | 16 | 17 | 20 | 17 | 16 | 16 | 16 | 16 |
| 25 | 25 | 25 | 25 | 26 | 29 | 26 | 25 | 25 | 25 | 25 |

FIG. 3A

A distance mask is created by calculating the Euclidean distance of pixels from the nearest edge pixel, and then entering that value into the corresponding memory location of the mask.

Distance Map

| 16 | 16 | 16 | 16 | 17 | 20 | 17 | 16 | 16 | 16 | 16 |
|----|----|----|----|----|----|----|----|----|----|----|
| 9  | 9  | 9  | 9  | 10 | 13 | 10 | 9  | 9  | 9  | 9  |
| 4  | 4  | 4  | 4  | 5  | dy=4 | 5 | 4 | 4 | 4 | 4 |
| 1  | 1  | 1  | 1  | 2  | 5  | 2  | 1  | 1  | 1  | 1  |
| E  | E  | E  | E  | 1  | 4  | 1  | E  | E  | E  | E  |
| 1  | 1  | 1  | 1  | 2  | 5  | 2  | 1  | 1  | 1  | 1  |
| 4  | 4  | 4  | 4  | 5  | 8  | 5  | dx=1 | 4 | 4 | 4 |
| 9  | 9  | 9  | 9  | 10 | 13 | 10 | 9  | 9  | 9  | 9  |
| 16 | 16 | 16 | 16 | 17 | 20 | 17 | 16 | 16 | 16 | 16 |
| 25 | 25 | 25 | 25 | 26 | 29 | 26 | 25 | 25 | 25 | 25 |

The Euclidean distance from the nearest edge point is calculated as $D = dx^2 + dy^2$. We do not take the square root of $D$ for computational efficiency.

FIG. 3B

Hexagonal Lattice

| 16 | 16 | 16 | 17 | 20 | 17 | 16 | 16 | 16 | 16 |
|----|----|----|----|----|----|----|----|----|----|
| 9  | 9  | 9  | 10 | 13 | 10 | 9  | 9  | 9  | 9  |
| 4  | 4  | 4  | 5  | 8  | 5  | 4  | 4  | 4  | 4  |
| 1  | 1  | 1  | 2  | 5  | 2  | 1  | 1  | E  | E  |
|    |    |    |    | 1  |    |    |    |    |    |
| E  | E  | E  | 1  | 4  | 1  | E  | E  | E  | E  |
|    |    |    |    | 1  |    |    |    |    |    |
| 1  | 1  | 1  | 2  | 5  | 2  | 1  | 1  | 1  | 1  |
| 4  | 4  | 4  | 5  | 8  | 5  | 4  | 4  | 4  | 4  |
| 9  | 9  | 9  | 10 | 13 | 10 | 9  | 9  | 9  | 9  |
| 16 | 16 | 16 | 17 | 20 | 17 | 16 | 16 | 16 | 16 |
| 25 | 25 | 25 | 26 | 29 | 26 | 25 | 25 | 25 | 25 |

FIG. 4

Odd rows are shifted to the right and even rows to the left, to form a hexagonal lattice. Each pixel now has six nearest neighbors as indicated by the hexagon in the figure. Note, no actual shifting or memory manipulation is performed; this is just a way to represent how neighbors are identified.

The distance value of the central pixel is subtracted from that of each of the neighbors and then the sign of the resultant value is stored. "X" marks the central pixel. +, and − represent the sign belonging to the neighbors. A neighbor can have a value of 0 as well.

Move clockwise around the central pixel, counting the transitions between -, and +. The only possible values for the number of transitions are 0, 2, 4, or 6.

Points marked with an "s" are saddle points.

Degeneracy Breaking Example

| | | | | | | | | | |
|---|---|---|---|---|---|---|---|---|---|
| E | 1 | 1 | 1 | 1 | 2 | 5 | 10 | 17 | 26 |
| E | E | E | E | E | 4 | 9 | 16 | 17 | 25 |
| 1 | 1 | 1 | 1 | 1 | 2 | 5 | 10 | 17 | 26 |
| 4 | 4 | 4 | 4 | 5 | 8 | 13 | 20 | 29 | |
| 4 | 5 | 2 | 1 | 2 | 5 | 10 | 17 | 26 | |
| 9 | 9 | 4 | 1 | E | 4 | 9 | 16 | 17 | 25 |
| 16 | 9 | 4 | 1 | E | 1 | 4 | 9 | 16 | 25 |
| 16 | 9 | 4 | 1 | E | 1 | 4 | 9 | 16 | 25 |
| 16 | 9 | 4 | 1 | E | 1 | 4 | 9 | 16 | 25 |
| 16 | 9 | 4 | 1 | E | 1 | 4 | 9 | 16 | 25 |

W and E are both degenerate with the central pixel.

FIG. 9A

Degeneracy Breaking Example

| E | 1 | 1 | 1 | 1 | 1 | 1 | 2 | 5 | 10 | 17 | 26 |
|---|---|---|---|---|---|---|---|---|----|----|----|
| E | E | E | E | E | 1 | 1 | 4 | 9 | 16 | 25 |
| 1 | 1 | 1 | 1 | 1 | ↙4 | 5 | 2 | 5 | 10 | 17 | 26 |
| 4 | 4 | 4 | 4 | 4→5 | | | | | | |
| 9 | 9 | 5 | 2 | 1 | 8 | 13 | 20 | 29 |
| 16 | 9 | 4 | 1 | 1 | 2 | 5 | 10 | 17 | 26 |
| 16 | 9 | 4 | 1 | E | 1 | 4 | 9 | 16 | 25 |
| 16 | 9 | 4 | 1 | E | 1 | 4 | 9 | 16 | 25 |
| 16 | 9 | 4 | 1 | E | 1 | 4 | 9 | 16 | 25 |
| 16 | 9 | 4 | 1 | | 1 | 4 | 9 | 16 | 25 |

W is replaced with WW and E is replaced with EE

FIG. 9B

After stepping out, "O"s are treated like negative numbers when counting transitions.

Saddle Points Defined

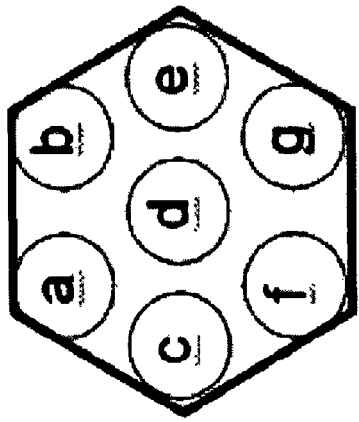

FIG. 10

Description:
Each of the 7 pixels in a hexagonal neighborhood will have a distance value from the nearest edge pixel, labeled as a-g. The distance d is subtracted from a, b, c, e, f, and g. This will produce positive, negative, and zero values. The number of transitions is then counted to determine if the middle pixel is indeed a saddle point. The location of the transitions is arbitrary and does not play a role in determining if a point is a saddle point. A distance value of zero is considered to be degenerate. A degeneracy breaking step is taken to deal with this case.

A pixel is a saddle point if the number of transitions is greater than 3.

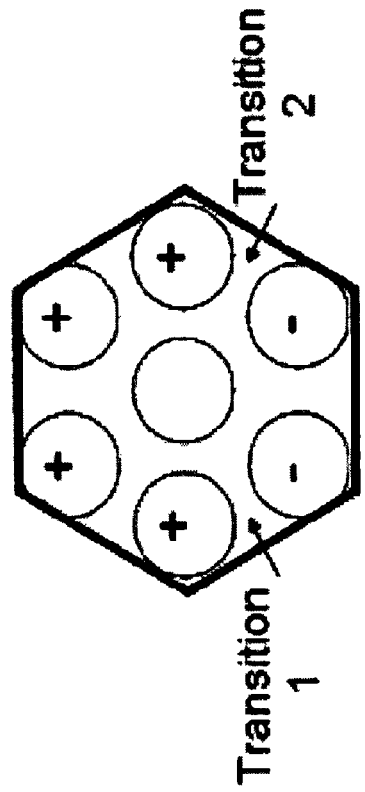

Simple Case:
Number of Transitions = 2
Not a Saddlepoint

FIG. 11A

Saddle Point Types

Horse Saddle:
Number of Transitions = 4
Saddlepoint

Monkey Saddle:
Number of Transitions = 6
Saddlepoint

Flood Fill to Create Segments

| $S_1$ | $S_1$ | $S_1$ | $S_1$ | $E$ | $S_3$ | $S_3$ | $S_3$ | $S_3$ |
|---|---|---|---|---|---|---|---|---|
| $S_1$ | $S_1$ | $S_1$ | $S_1$ | $E$ | $S_3$ | $S_3$ | $S_3$ | $S_3$ |
| $S_1$ | $S_1$ | $S_1$ | $S_1$ | $E$ | $S_3$ | $S_3$ | $S_3$ | $S_3$ |
| $S_1$ | $S_1$ | $S_1$ | $S_1$ | $E$ | $S_3$ | $S_3$ | $S_3$ | $S_3$ |
| $S_1$ | $S_1$ | $S_1$ | $S_1$ | $S_1$ | $E$ | $E$ | $E$ | $S_3$ |
| $E$ | $E$ | $E$ | $S_1$ | $S_1$ | $S_1$ | $S_1$ | $E$ | $E$ |
| $S_2$ | $S_2$ | $E$ | $E$ | $S_1$ | $S_1$ | $S_1$ | $S_1$ | $S_1$ |
| $S_2$ | $S_2$ | $S_2$ | $E$ | $E$ | $S_1$ | $S_1$ | $S_1$ | $S_1$ |
| $S_2$ | $S_2$ | $S_2$ | $S_2$ | $E$ | $S_1$ | $S_1$ | $S_1$ | $S_1$ |
| $S_2$ | $S_2$ | $S_2$ | $S_2$ | $E$ | $S_1$ | $S_1$ | $S_1$ | $S_1$ |

This shows the resultant segment map after flood filling. $S_i$ is the segment id of a pixel.

FIG. 13

COMPUTER-IMPLEMENTED METHOD FOR EFFICIENT IMAGE SEGMENTATION USING AUTOMATED SADDLE-POINT DETECTION

CROSS-REFERENCE TO RELATED APPLICATIONS

The present application claims the benefit of U.S. Provisional Patent Application No. 60/805,792, filed Jun. 26, 2006, by inventors Edward Ratner and Schuyler A. Cullen, the disclosure of which is hereby incorporated by reference.

BACKGROUND

1. Field of the Invention

The present application relates generally to digital image processing and more particularly to the automated segmentation of image data.

2. Description of the Background Art

Image segmentation generally concerns selection and/or separation of an object or other selected part of an image dataset. The dataset is in general a multi-dimensional dataset that assigns data values to positions in a multi-dimensional geometrical space. In particular, the data values may be pixel values, such as brightness values, grey values or color values, assigned to positions in a two-dimensional plane.

Image segmentation has been a challenging problem in the field of computer vision for many years. The goal of a segmentation method is to pick out the objects or other selected parts in an image—given the image data. The uses include the fields of object recognition and point-and-click software. There have been specific image segmentation techniques designed when the content of the image is known ahead of time. Examples include segmentation techniques for x-ray images of the human body and for defect detection on silicon wafers. These methods are not applicable to other images.

Some of the other techniques target images in general. Some of these other techniques include region-based segmentation and the watershed algorithm. These suffer from the severe problem of separate objects being attached due to small overlaps where the boundary between objects is not clear. Prior systems have used a segmentation technique for generic images. The technique uses edge detection as the first step, and then uses a brush-filling technique as the second step. This segmentation technique performs quite well for a wide range of images. Due to the heavy computational cost, however, the algorithm is only implementable for real-time performance in dedicated hardware.

BRIEF DESCRIPTION OF THE DRAWINGS

FIG. 3A shows an example distance map in accordance with an embodiment of the invention.

FIG. 3B shows the example distance map indicating a method for its calculation in accordance with an embodiment of the invention.

FIG. 4 depicts an example hexagonal lattice for purposes of conceptual understanding in accordance with an embodiment of the invention.

FIGS. 9A-9C shows an example of degeneracy breaking in accordance with an embodiment of the invention.

FIG. 10 provides a diagram for discussing saddle points in accordance with an embodiment of the invention.

FIG. 11A depicts a simple case where the center pixel is not a saddle point in accordance with an embodiment of the invention.

FIG. 13 shows an example of flood filled segments in accordance with an embodiment of the invention.

DETAILED DESCRIPTION

The present application discloses an automated method for efficient segmentation using saddle point detection on a general purpose microprocessor. In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

The present disclosure also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories, random access memories, EPROMs, EEPROMs, magnetic or optical cards, or any type of media suitable for storing electronic instructions, and each coupled to a computer system bus or other data communications system.

The methods presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present disclosure is not described with reference to any particular programming language. It will be appreciated that a variety of programming languages may be used to implement the teachings of the invention as described herein.

Figure 1:
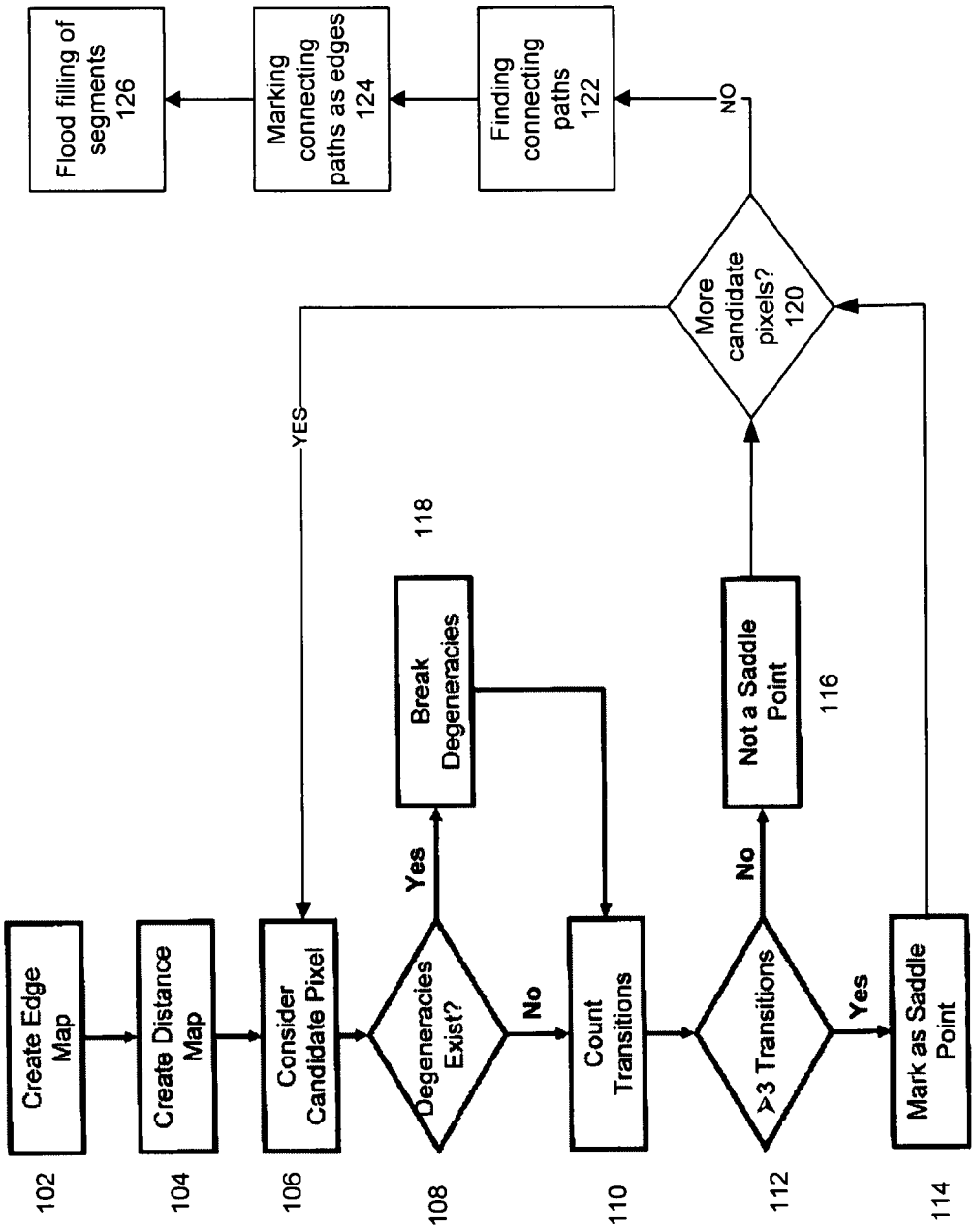
FIG. 1 is a flowchart of a method of efficient image segmentation using automated saddle-point detection in accordance with an embodiment of the invention.

The present method and system use an object segmentation method that is implemented in software on general purpose microprocessor. The segmentation method performs well on a wide range of image content and one embodiment runs real-time for processing 720×480 video at 30 frames per second on a 1 GHz Pentium CPU. In accordance with an embodiment of the invention, the segmentation method is depicted in the flow chart of FIG. 1 and comprises the following steps.

Figure 2:
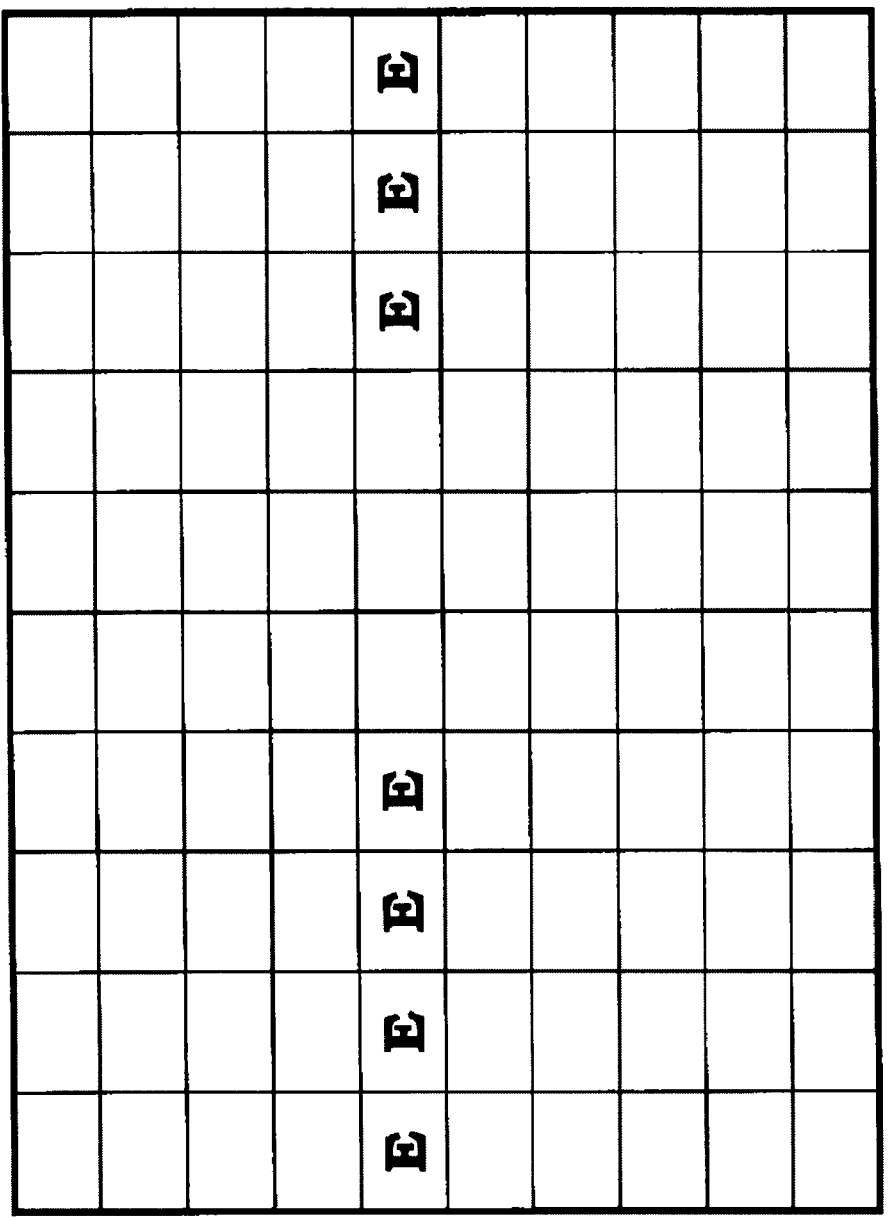
FIG. 2 shows an example edge mask in accordance with an embodiment of the invention.

1) Edge detection is performed on the image per block 102 to create an edge mask or map. In accordance with one embodiment, Gaussian derivative filters are used to compute the gradient of the image values. Then local gradient maxima are detected. These are subject to a thresholding process, where the maxima with gradient magnitudes below a numerical threshold are discarded. An example edge mask is shown in FIG. 2.

2) In block 104, a distance map is computed from the edge pixels, where each pixel in the distance map receives a value indicating its distance from the closest edge point. In one embodiment, the distance map is computed in two passes over the image frame, and involves only comparisons and increments by 1. The distance values are all integers. The pixels adjacent to the edges are given a value of 1. Pixels next to pixels with value i are given the value i+1. This is a so-called Manhattan distance map. In another embodiment, a Euclidean distance map may be computed. An example of a Euclidean distance map is shown in FIG. 3A, and its calculation is discussed below in relation to FIG. 3B.

3) Per blocks 106 through 120, saddle points are detected on the distance map. Saddle points are points where the gradient value of the distance function are zero or below a minimal threshold (this threshold has no relation to the threshold of the gradient maxima discussed above in relation to the edge detection) and the point is neither a local maximum or a local minimum of the distance map function. In one embodiment, the gradient of the distance map is computed and the saddle point detected if the gradient value is zero. The point is verified to not be a maximum or a minimum. In one embodiment, this is done by checking that there are in fact points in the neighborhood of the saddle point with both larger and smaller values. This may be accomplished in one pass through the image frame and involves integer additions and comparisons. These blocks are discussed in further detail below in relation to FIGS. 4 through 11C in accordance with an embodiment of the invention.

4) Saddle points are connected to the actual edge points by forming connecting paths per block 122, and the connecting paths are also marked as edges per block 124. In one embodiment, the saddle points are connected by stepping along the gradient of the distance map function. This may involve two passes through the image frame and only integer additions and comparisons. In accordance with an embodiment of the invention, a procedure for making the saddle connections is discussed further below in relation to FIGS. 12A through 12C.

5) The resulting "combined" edge map is flood filled per block 126, where every connected region is identified as an object segment. In one embodiment, this is accomplished in two passes. The pixel inheritance is that a pixel inherits its segment from either the pixel above it or to the left as long as there is no edge on the forward pass. And from the pixel down and to the right on the backward pass. An example flood fill is discussed below in relation to FIG. 13.

The above-described automated segmentation method offers segmentation of a wide range of generic images. In addition, however, it is extremely computationally efficient—and may be implemented in software for real-time performance on modern personal computers and other types of multi-media processors. The following discussion describes the automated segmentation method in further detail.

FIG. 2 shows an example edge mask in accordance with an embodiment of the invention. As shown, the pixels marked with an "E" are edge pixels.

FIG. 3A shows an example distance map in accordance with an embodiment of the invention, and FIG. 3B shows the example distance map indicating a method for its calculation in accordance with an embodiment of the invention. As indicated, a distance map is created by calculating the square of the Euclidean distance of pixels from the nearest edge pixel, and then entering that value into the corresponding memory location of the mask. The square of the Euclidean distance from the nearest edge point is calculated as $D=dx^2+dy^2$. For computational efficiency, the square root of D is not computed.

FIG. 4 depicts an example hexagonal lattice for purposes of conceptual understanding in accordance with an embodiment of the invention. To create the hexagonal lattice, odd rows may be conceptually shifted to the right, and even rows may be conceptually shifted to the left. Each pixel in the hexagonal lattice has six nearest neighbors, as indicated by the hexagon in the figure. Note that no actual shifting or memory manipulation is performed; the formation of the hexagonal lattice is a way to represent conceptually how neighbors are defined in accordance with an embodiment of the invention.

Figure 5:
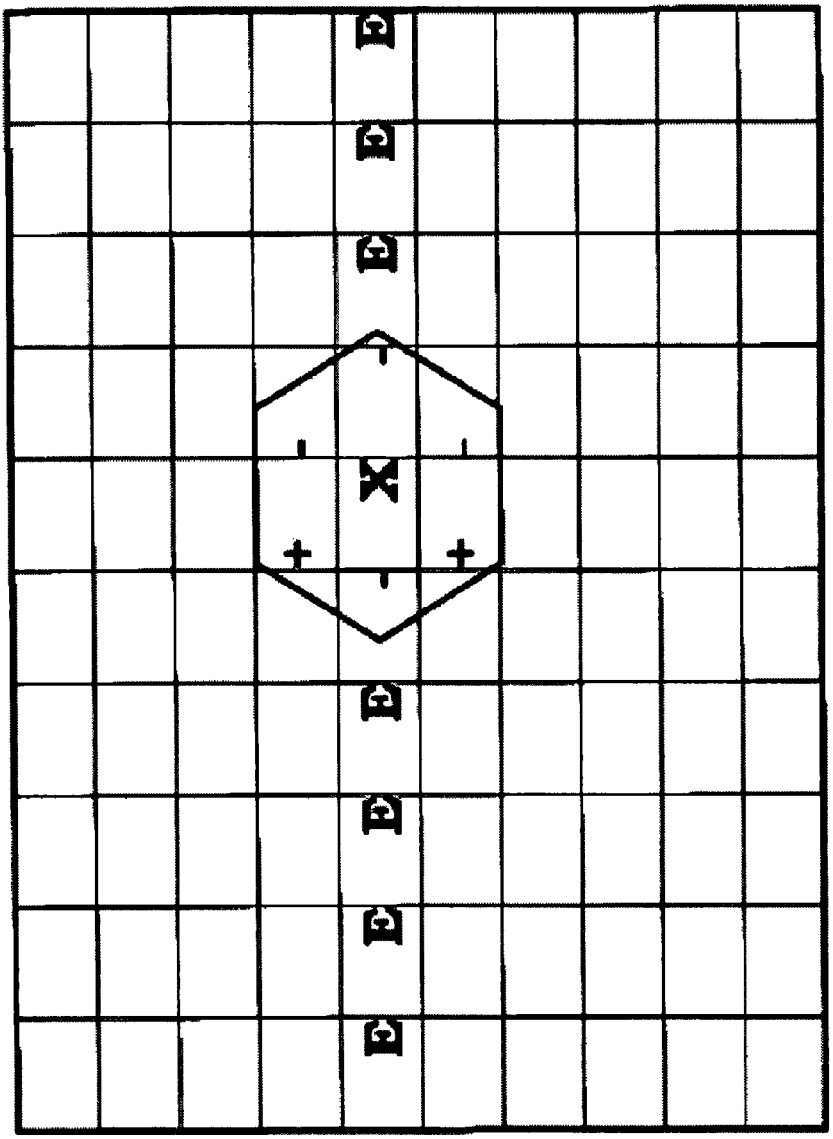
FIG. 5 shows an example of subtraction of a central pixel distance in accordance with an embodiment of the invention.

FIG. 5 shows an example of subtraction of a central pixel distance in accordance with an embodiment of the invention. "X" marks the central pixel in this example. The distance value of the central pixel is subtracted from that of each of the neighboring pixels (per the hexagonal lattice discussed above) and then the sign of the resultant value may be stored. + and − represent the sign belonging to the neighbors after the subtraction of the central pixel distance. Note that a neighbor may have a value of zero (neither positive nor negative) if it has the same distance value as the central pixel.

Figure 6:
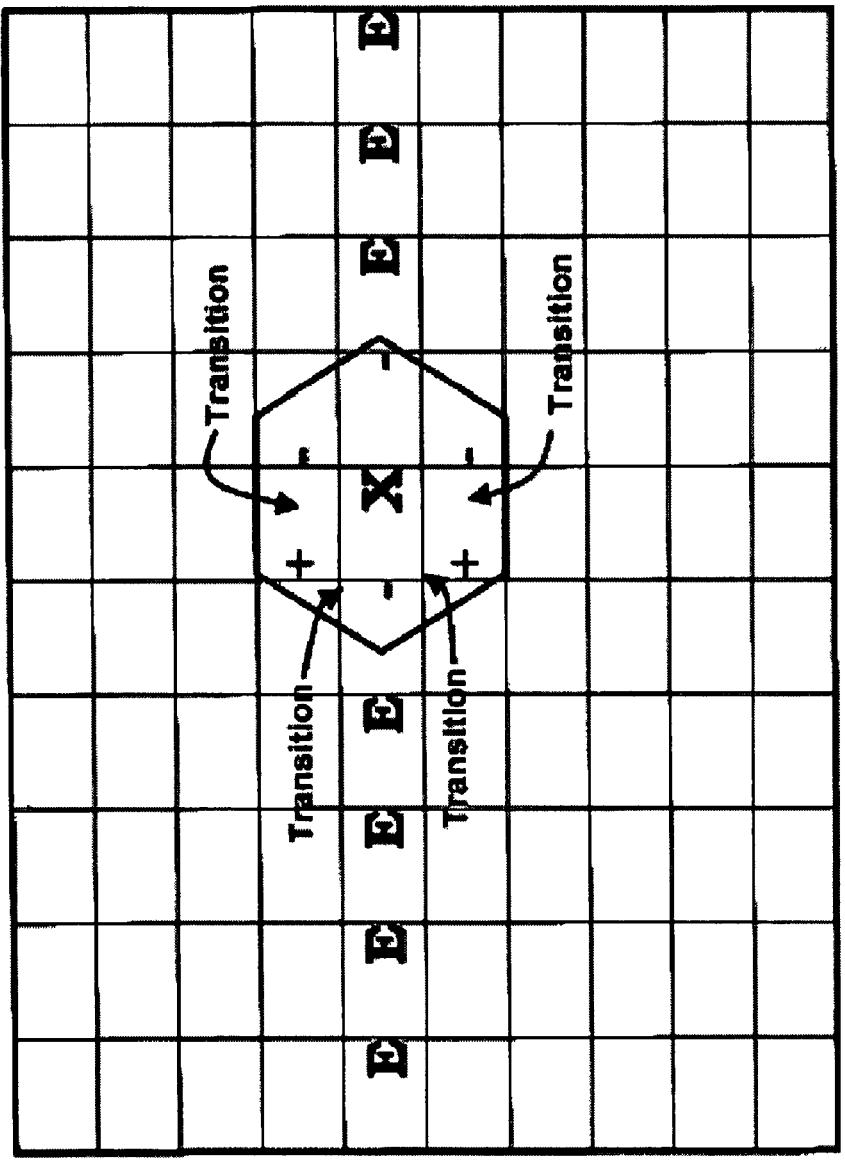
FIG. 6 shows an example of counting transitions in accordance with an embodiment of the invention.

FIG. 6 shows an example of counting transitions in accordance with an embodiment of the invention. Transitions are changes in the sign. For example, moving clockwise around the central pixel, a count of the transitions between + and − (or − and +) may be made. The example shown in FIG. 6 has four transitions. Given the six neighbors of a hexagonal lattice, the possible values for the number of transitions are 0, 2, 4, and 6.

Figure 7:
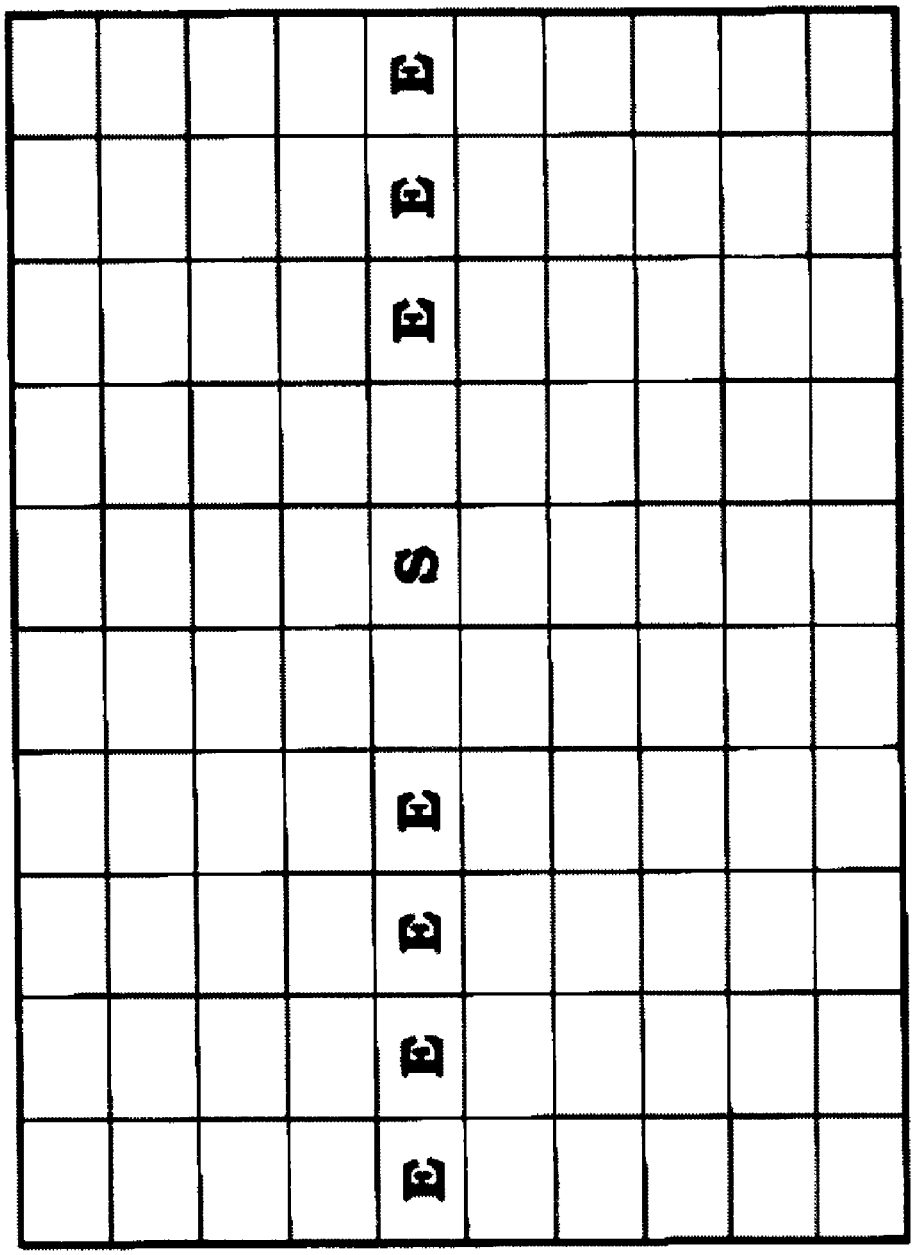
FIG. 7 depicts a pixel marked as a saddle point in accordance with an embodiment of the invention.

FIG. 7 depicts a pixel marked as a saddle point in accordance with an embodiment of the invention. Here, since the central pixel "X" in FIG. 6 has four transitions, and four is greater than three, that central pixel may be designated and marked as a saddle point "S".

Figure 8:
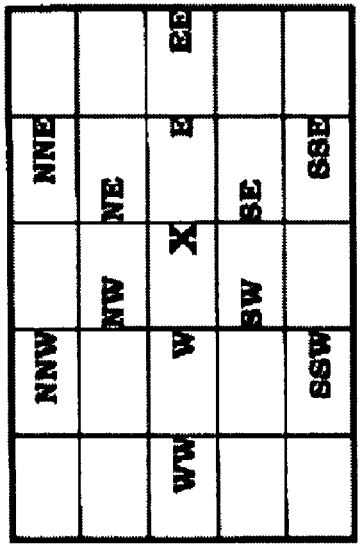
FIG. 8 provides a diagram for discussing degeneracy breaking in accordance with an embodiment of the invention.

FIG. 8 provides a diagram for discussing degeneracy breaking in accordance with an embodiment of the invention. Degeneracies occur in the distance map when pixels in the hexagonal neighborhood have the same distance as the central pixel. Degeneracies may be due to the non-continuous property of the distance map.

In accordance with an embodiment of the invention, stepping out a pixel along the direction of the neighbor with the degenerate distance may help determine the correct shape of the distance manifold. Let D(p) be defined as the distance map value at the pixel location p. Then the stepping out direction for the various neighbors to break a degeneracy is as follows and as illustrated in FIG. 8.

W→WW: If the degenerate neighbor (that with the same value as the central pixel) is in the W (west) location, when the stepping out is also in the west direction so as to select the pixel in the WW location shown in FIG. 8.

NW→NNW: If the degenerate neighbor (that with the same value as the central pixel) is in the NW (north-west) location, when the stepping out is also in the north-west direction so as to select the pixel in the NNW location shown in FIG. 8.

NE→NNE: If the degenerate neighbor (that with the same value as the central pixel) is in the NE (north-east) location, when the stepping out is also in the north-east direction so as to select the pixel in the NNE location shown in FIG. 8.

E→EE: If the degenerate neighbor (that with the same value as the central pixel) is in the E (east) location, when the stepping out is also in the east direction so as to select the pixel in the EE location shown in FIG. 8.

SE→SSE: If the degenerate neighbor (that with the same value as the central pixel) is in the SE (south-east) location, when the stepping out is also in the south-east direction so as to select the pixel in the SSE location shown in FIG. 8.

SW→SSW: If the degenerate neighbor (that with the same value as the central pixel) is in the SW (south-west) location, when the stepping out is also in the south-west direction so as to select the pixel in the SSW location shown in FIG. 8.

In accordance with an embodiment of the invention, if the new neighbor (after stepping out) is still degenerate (has the same distance value as the central pixel), then the stepping may be stopped and the zero value (due to the degeneracy) may be grouped with the negative numbers for the purpose of counting transitions.

Figure 9C:
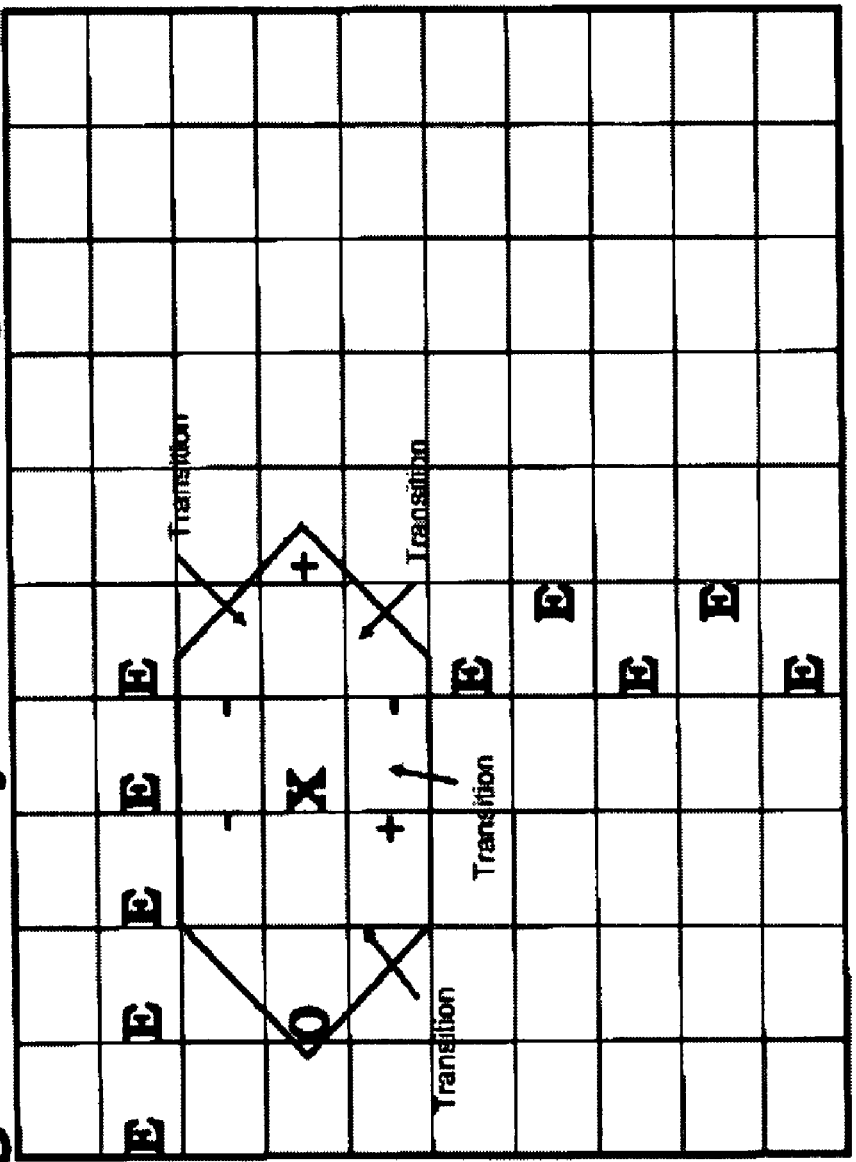

FIGS. 9A-9C shows an example of degeneracy breaking in accordance with an embodiment of the invention. The example hexagonal neighborhood shown in FIG. 9A includes two degeneracies, one at the W neighbor location and the other at the E neighbor location.

As discussed above, stepping out occurs in the W and E directions so as to consider the pixels at the WW and EE locations. This is shown in FIG. 9B.

In this example, the pixel at the EE location is no longer degenerate (it is positive after subtracting the distance of the central pixel), while the pixel at the WW location is still degenerate (it has a zero value after subtracting the distance of the central pixel). As discussed above, the zero value of the WW neighbor is thus treated as a negative value for the purpose of counting transitions. This is shown in FIG. 9C.

FIG. 10 provides a diagram for discussing saddle points in accordance with an embodiment of the invention. As shown, each of the seven pixels in a hexagonal neighborhood (including the central pixel) will have a distance value from the nearest edge pixel, labeled as "a" through "g" as shown in the figure. The distance "d" (of the central pixel) is subtracted from each of the distances "a", "b", "c", "e", "f", and "g". Each subtraction may produce positive, negative, or zero value. The number of transitions is then counted to determine if the middle pixel is indeed a saddle point. The location of the transitions in the neighborhood may be considered as arbitrary in that it does not play a role in determining if a pixel is a saddle point or not. A distance value of zero may be considered to be degenerate. In accordance with an embodiment of the invention, a degeneracy breaking procedure may be applied to deal with such cases. In accordance with an embodiment of the invention, a pixel may be designated as a saddle point if the number of transitions is greater than three.

FIG. 11A depicts a simple case where the center pixel is not a saddle point in accordance with an embodiment of the invention. In this simple case, the number of transitions is counted to be two. Since two is not greater than three, the center pixel in this case is determined to not be a saddle point.

Figure 11B:
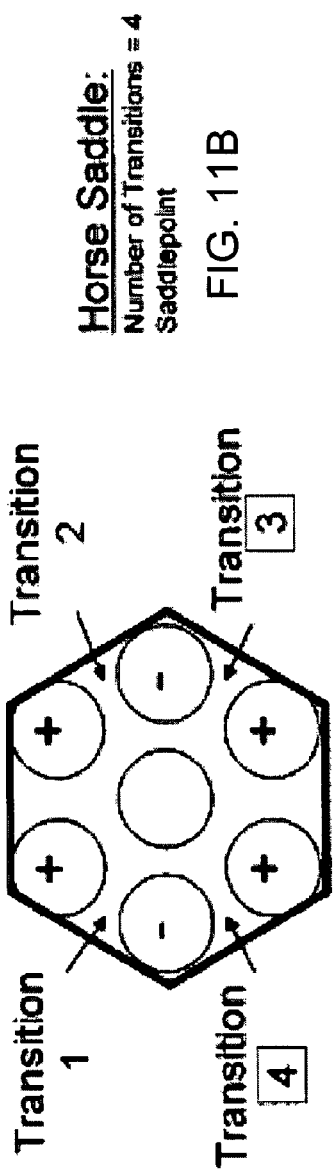
FIG. 11B depicts a case where the center pixel is a "horse" saddle point in accordance with an embodiment of the invention.

FIG. 11B depicts a case where the center pixel is a "horse" saddle point in accordance with an embodiment of the invention. In this case, the number of transitions is determined to be four. Since four is greater than three, the center pixel in this case is determined to be a saddle point. More particularly, one may consider such a saddle point with four transitions to be a "horse" saddle point.

Figure 11C:
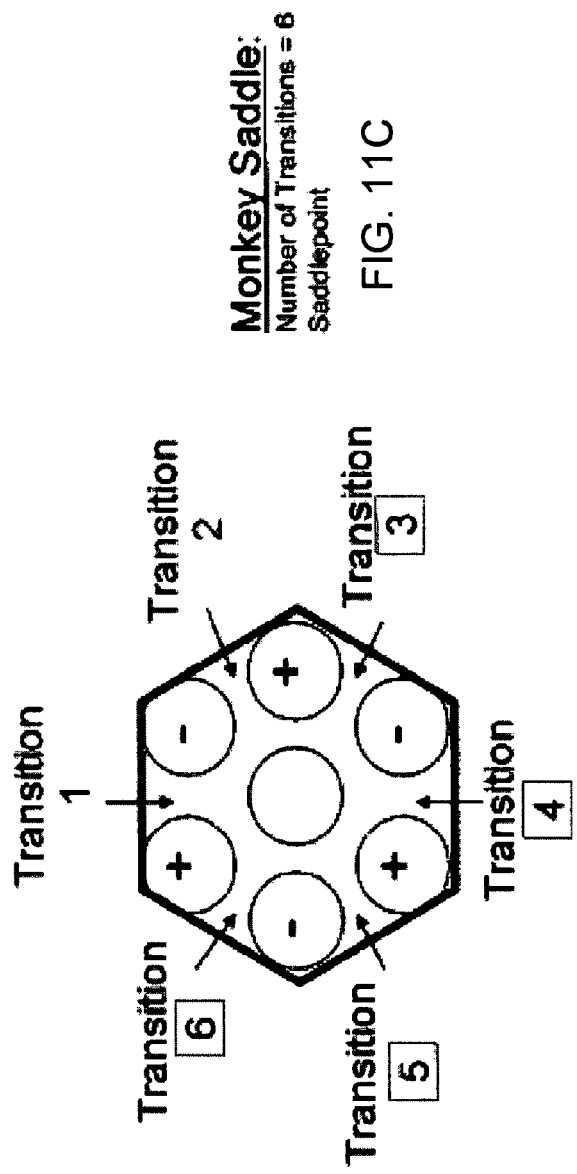
FIG. 11C depicts a case where the center pixel is a "monkey" saddle point in accordance with an embodiment of the invention.

FIG. 11C depicts a case where the center pixel is a "monkey" saddle point in accordance with an embodiment of the invention. In this case, the number of transitions is determined to be six. Since six is greater than three, the center pixel in this case is determined to be a saddle point. More particularly, one may consider such a saddle point with six transitions to be a "monkey" saddle point.

Figure 12A:
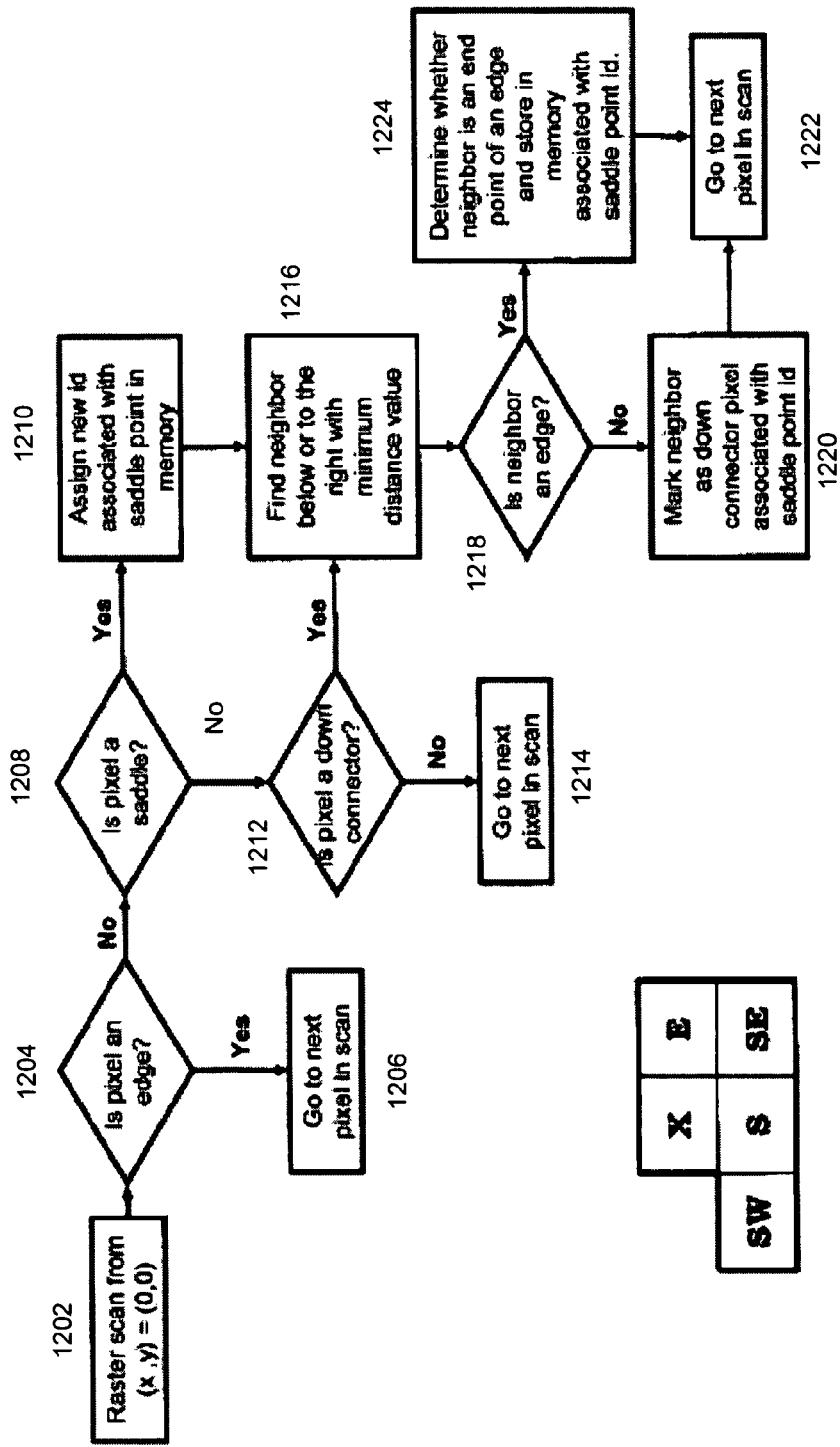
FIGS. 12A-12C provide flow charts depicting a procedure for determining saddle connections in accordance with an embodiment of the invention.
Figure 12B:
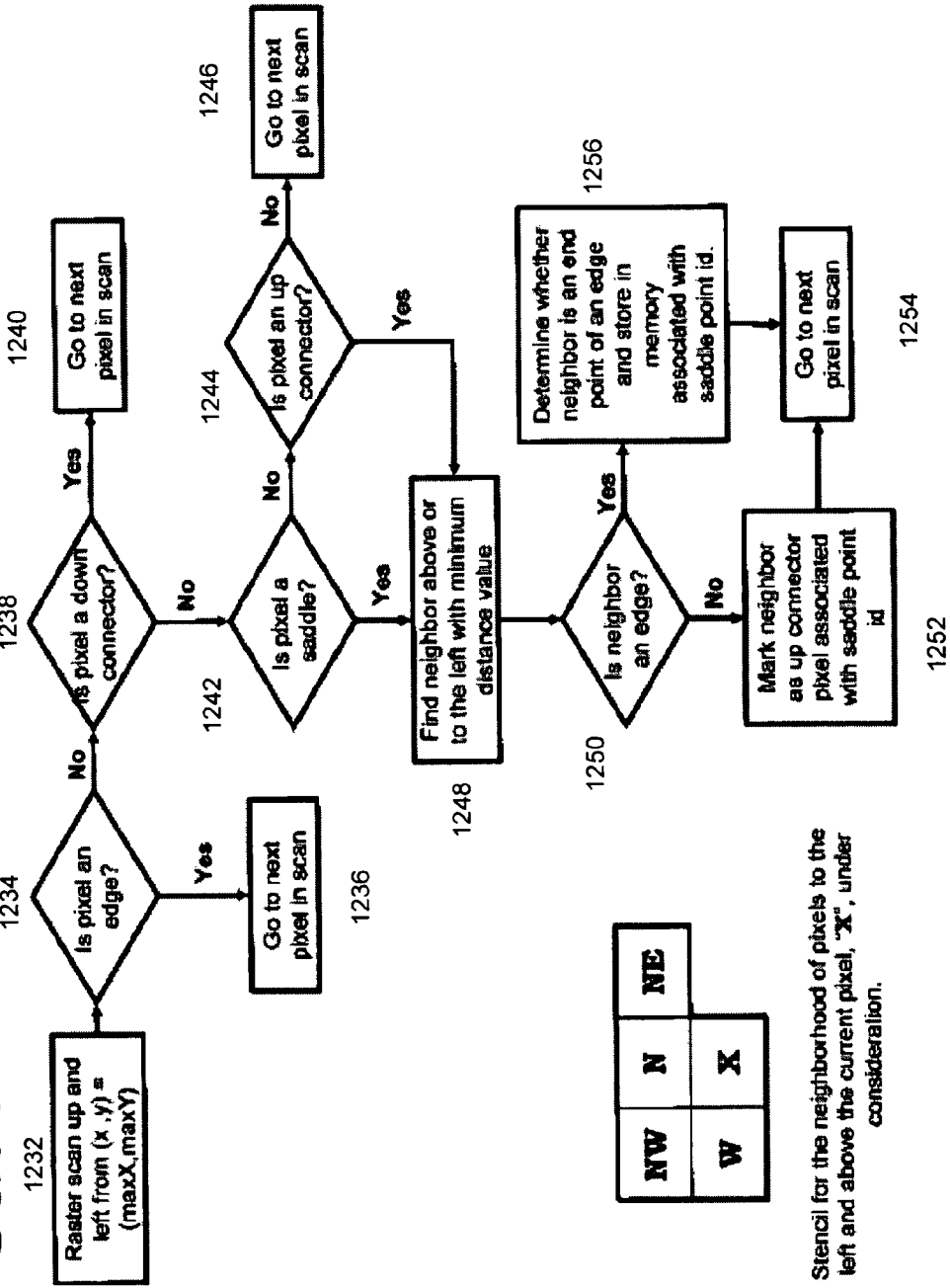
Figure 12C:
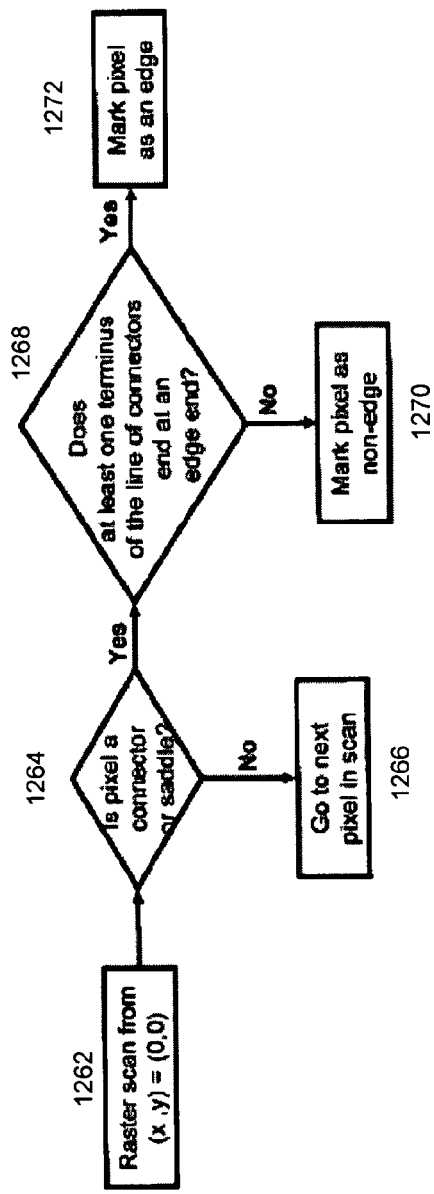

FIGS. 12A-12C give flow charts depicting a procedure for determining saddle connections in accordance with an embodiment of the invention. These saddle connections may take the form of connector pixels which connect edge pixels and saddle-point pixels to delineate image segments.

FIG. 12A shows a procedure 1200 for a first scan to determine "down" connector pixels in accordance with an embodiment of the invention. Per block 1202, since the procedure is looking for "down" connector pixels, the pixels may be scanned in a raster pattern starting from the "upper-left" of an image frame with the pixel at (x,y) location=(0,0), and ending at the "lower-right" of the image frame with the pixel at the (x,y) location=(maxX, maxY).

In block 1204, a determination may be first made as to whether the pixel being considered is an edge pixel. If yes, then the procedure goes to the next pixel in the raster scan pattern for consideration per block 1206. If not, then the procedure moves on to block 1208.

In block 1208, a determination may be then made as to whether the pixel being considered is a saddle pixel. If the pixel is a saddle pixel, then according to block 1210 the pixel is assigned a new identifier which is associated with that saddle point in memory. This identifier may be subsequently used as discussed below in relation to blocks 1220 and 1224. The procedure then moves on to block 1216.

On the other hand, if the pixel is not a saddle pixel, then according to block 1212 a determination may be then made as to whether the pixel being considered has already been designated as a "down" connector pixel. If not, then per block 1214 the procedure goes to the next pixel in the raster scan pattern for consideration. If yes, then the procedure moves on to block 1216.

In block 1216, a determination is made as to whether the neighbor below or to the right has a minimum distance value. Neighbors below or to the right of pixel are depicted in the stencil shown in FIG. 12A. Per the stencil, these neighbors are the pixels at the E, SW, S, and SE locations relative to the pixel at the X location.

Per block 1218, that neighbor (with the minimum distance value of the pixels below or to the right) is then examined to see if it is an edge pixel.

If that neighbor is not an edge pixel, then per block 1220 the pixel is marked as a "down" connector pixel which is associated with the aforementioned saddle point identifier. Thereafter, per block 1222, the procedure goes to the next pixel in the raster scan pattern for consideration.

Otherwise, if that neighbor is an edge pixel, then per block 1224, a determination is made as whether that neighbor is an end point (as opposed to a middle point) of an edge. If so, the neighbor is appropriately marked and associated with the aforementioned saddle point identifier.

FIG. 12B shows a procedure 1230 for a second scan to determine "up" connector pixels in accordance with an embodiment of the invention. Per block 1232, since the procedure is looking for "up" connector pixels, the pixels may be scanned in a raster pattern starting from the "lower-right" of an image frame with the pixel at (x,y) location=(maxX, maxY), and ending at the "upper-left" of the image frame with the pixel at the (x,y) location=(0,0).

In block 1234, a determination may be first made as to whether the pixel being considered is an edge pixel. If yes, then the procedure goes to the next pixel in the raster scan pattern for consideration per block 1236. If not, then the procedure moves on to block 1238.

In block 1238, a determination may be then made as to whether the pixel being considered has already been designated as a "down" connector. If the pixel is a down connector, then per block 1240 the procedure goes to the next pixel in the raster scan pattern for consideration. If the pixel is not a down connector, then the procedure moves on to block 1242.

In block 1242, a determination may be then made as to whether the pixel being considered is a saddle point. If the pixel is not a saddle point, then per block 1244 a determination may then be made as to whether the pixel being considered has already been designated as an "up" indicator. If the pixel is not an up indicator, then per block 1246 the procedure goes to the next pixel in the raster scan pattern for consideration. On the other hand, if the pixel is an up connector, then the procedure moves on to block 1248.

In block 1248, a determination is made as to whether the neighbor above or to the left has a minimum distance value. Neighbors above or to the left of pixel are depicted in the stencil shown in FIG. 12B. Per the stencil, these neighbors are the pixels at the W, NW, N, and NE locations relative to the pixel at the X location.

Per block 1250, that neighbor (with the minimum distance value of the pixels below or to the right) is then examined to see if it is an edge pixel. If that neighbor is not an edge pixel, then per block 1252 the pixel is marked as a "up" connector pixel which is associated with the aforementioned saddle point identifier. Thereafter, per block 1254, the procedure goes to the next pixel in the raster scan pattern for consideration.

Otherwise, if that neighbor is an edge pixel, then per block 1256, a determination is made as whether that neighbor is an end point (as opposed to a middle point) of an edge. If so, the neighbor is appropriately marked and associated with the aforementioned saddle point identifier. Thereafter, per block 1254, the procedure goes to the next pixel in the raster scan pattern for consideration.

FIG. 12C shows a procedure 1260 for a final scan for the saddle connections procedure in which connectors and saddle points are designated as edges or non-edges in accordance with an embodiment of the invention. In general, the procedure 1260 raster scans along the pixels. If a line of connectors originating from a saddle point does not end at an end point of an edge on at least one end of the connector line, then the entire line of connectors is removed from consideration as new edge pixels. However, if the criterion is satisfied (i.e. the line of connectors originating from a saddle point does end at an end point of an edge on at least one end of the connector line), then the line of connectors is marked as new edge pixels. This criterion advantageously prevents spurious lines of connectors from connecting parallel edges to one another, and allows only edges that were broken during the edge formation process to be reconnected.

Particular steps of an embodiment of the procedure 1260 are now discussed with reference to the block diagram in FIG. 12C. Per block 1262, the pixels may be scanned in a raster pattern starting from the "upper-left" of an image frame with the pixel at (x,y) location=(0,0), and ending at the "lower-right" of the image frame with the pixel at the (x,y) location= (maxX, maxY).

In block 1264, a determination may be then made as to whether the pixel being considered is either a connector or a saddle point. If it is neither, then per block 1266 the procedure goes to the next pixel in the raster scan pattern for consideration.

On the other hand, if the pixel is either a connector or a saddle point, then the procedure moves on to block 1268. In block 1268, a determination is made as to whether at least one terminus of the line of connectors ends at an edge end. If not, then per block 1270 the pixel is marked as a non-edge pixel (i.e. the pixel, although previously designated a connector, is removed from consideration). If yes, then per block 1272 the pixel is marked as an edge pixel.

FIG. 13 shows an example of flood filled segments in accordance with an embodiment of the invention. As seen, regions which are completely enclosed by the technique disclosed above, may then be flood filled to create, in this example, segments $S_1$, $S_2$, and $S_3$.

Figure 14:
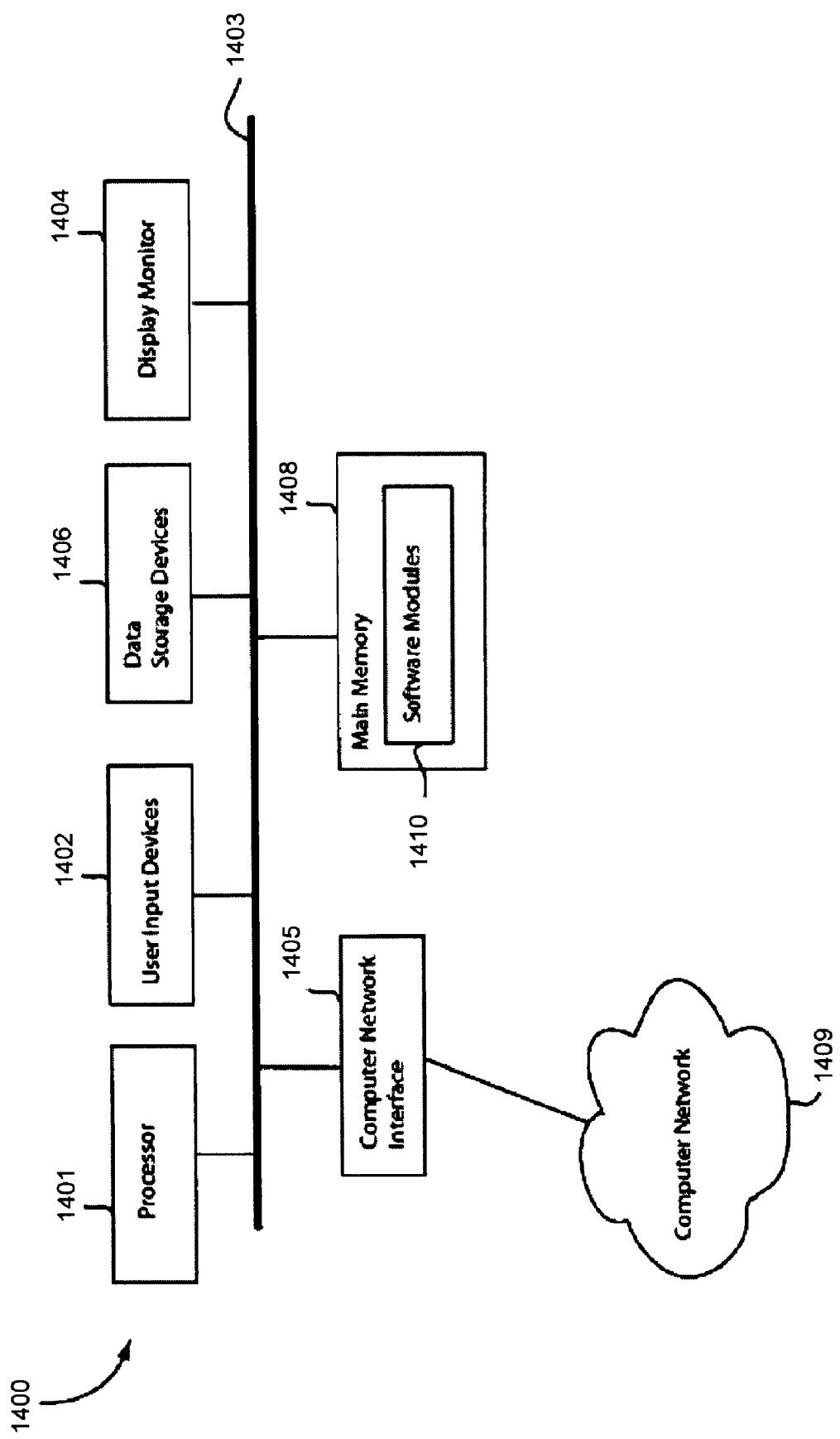
FIG. 14 is a schematic diagram of an example computer system or apparatus which may be used to execute the computer-implemented procedures for image segmentation in accordance with an embodiment of the invention.

FIG. 14 is a schematic diagram of an example computer system or apparatus 1400 which may be used to execute the computer-implemented procedures for image segmentation in accordance with an embodiment of the invention. The computer 1400 may have less or more components than illustrated. The computer 1400 may include a processor 1401, such as those from the Intel Corporation or Advanced Micro Devices, for example. The computer 1400 may have one or more buses 1403 coupling its various components. The computer 1400 may include one or more user input devices 1402 (e.g., keyboard, mouse), one or more data storage devices 1406 (e.g., hard drive, optical disk, USB memory), a display monitor 1404 (e.g., LCD, flat panel monitor, CRT), a computer network interface 1405 (e.g., network adapter, modem), and a main memory 1408 (e.g., RAM).

In the example of FIG. 14, the main memory 1408 includes software modules 1410, which may be software components to perform the above-discussed computer-implemented procedures. The software modules 1410 may be loaded from the data storage device 1406 to the main memory 1408 for execution by the processor 1401. The computer network interface 1405 may be coupled to a computer network 1409, which in this example includes the Internet.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A computer-implemented method of image segmentation using automated saddle point detection, the method comprising:
   creating an edge map by edge detection;
   creating a distance map based on the edge map;
   detecting, using a computer, saddle points using the distance map;
   determining connector pixels using the saddle points;
   marking the connector pixels forming valid connecting paths as edge pixels; and
   flood filling within edges to designate image segments.

2. The method of claim 1, wherein the distance map indicates a distance of each pixel from a nearest edge pixel.

3. The method of claim 2, wherein detecting the saddle points includes counting transitions between positive and negative values and determining that a pixel is a saddle point if the number of transitions is greater than a threshold number.

4. The method of claim 3, wherein a positive value indicates that a neighboring pixel is farther from an edge pixel, and a negative value indicates that a neighboring pixel is closer to an edge pixel.

5. The method of claim 4, wherein the threshold number is three.

6. The method of claim 4, wherein if a neighboring pixel is a same distance from an edge pixel as a pixel under consideration, then a degeneracy breaking procedure is executed.

7. The method of claim 5, wherein the degeneracy breaking procedure includes stepping out from the neighboring pixel.

8. The method of claim 1, wherein determining connecting paths includes multiple scan procedures to find connector pixels, and a scan procedure to mark said connector pixels as edge pixels or non-edge pixels.

9. The method of claim 8, wherein the multiple scan procedures includes two scan procedures with opposite scanning orders.

10. A computer apparatus configured for image segmentation using automated saddle point detection, the apparatus comprising:
    a processor for executing computer-readable program code;
    memory for storing in an accessible manner computer-readable data;
    computer-readable program code configured to generate an edge map by edge detection;
    computer-readable program code configured to generate a distance map based on the edge map;
    computer-readable program code configured to detect saddle points using the distance map;
    computer-readable program code configured to determine connector pixels using the saddle points;
    computer-readable program code configured to mark connector pixels forming valid connecting paths as edge pixels; and
    computer-readable program code configured to flood fill within edges to designate image segments.

* * * * *